United States Patent [19]

Itani et al.

[11] Patent Number: 4,489,345
[45] Date of Patent: Dec. 18, 1984

[54] COLOR VIDEO CAMERA

[75] Inventors: Takashi Itani; Susumu Kozuki; Takashi Narasawa, all of Kanagawa, Japan

[73] Assignee: Canon Kabushiki Kaisha

[21] Appl. No.: 571,908

[22] Filed: Jan. 18, 1984

Related U.S. Application Data

[63] Continuation of Ser. No. 300,664, Sep. 9, 1981, Pat. No. 4,454,532.

[30] Foreign Application Priority Data

Sep. 10, 1980 [JP] Japan .................................. 55-125505
Nov. 21, 1980 [JP] Japan .................................. 55-165176

[51] Int. Cl.³ ............................................. H04N 5/35
[52] U.S. Cl. .................................................. 358/29
[58] Field of Search .............. 358/21 R, 29, 160, 163

[56] References Cited

U.S. PATENT DOCUMENTS 4,249,197  2/1981  Van Spaandonk ............... 358/29
4,340,903  7/1982  Tamura ............................ 358/29
4,368,482  1/1983  Machida ........................... 358/29

OTHER PUBLICATIONS

"A New Automatic Color Camera", Underhill, Journal SMPTE, vol. 81, pp. 450-453, Jun. 1972.

Primary Examiner—Michael A. Masinick
Attorney, Agent, or Firm—Toren, McGeady and Stanger

[57] ABSTRACT

A color video camera includes an image pick-up device for converting images into electrical signals including a plurality of color signal elements, white picture forming circuitry for introducing a white picture to the image pick-up device and a white balance control for controlling a proportion of each color signal element contained in an output of the image pick-up device so as to have a prescribed ratio. A power source switch is included for supplying current to individual circuits in the video camera. The camera also includes an operation member having three positions. The member turns off the power source switch in a first position; it turns on the switch in a second position to control the white picture forming circuitry and introduces the white picture to the image pick-up device, thereby actuating the white balance control; in a third position it turns on the power source switch to control the white picture forming circuitry so as to prevent introduction of the white picture to the image pick-up device. The second position is located between the first and third positions.

4 Claims, 10 Drawing Figures

COLOR VIDEO CAMERA

This is a continuing application of application Ser. No. 300,664, filed Sept. 9, 1981, now U.S. Pat. No. 4,454,532.

BACKGROUND OF THE INVENTION

1. Field of the Invention

This invention relates to a device for adjustment of white balance in a color video camera.

2. Description of the Prior Art

In a color video camera, the white color portion of a photographed object is put out approximately as a white color signal. Therefore, many color video cameras are provided with white balance adjustment devices. In the conventional method for adjusting the white balance, a uniformly illuminated white or gray object covers the whole visual field of the view finder and, under that condition, a white balance is obtained by carrying out gain adjustment for each color channel with an applicable adjustment device adjusted under that condition. The conventional method, however, has necessitated use of a white object. Therefore, it has sometimes been difficult to obtain a uniformly white object when shooting on location. The conventional method for adjustment of white balance, thus, has necessitated the use of a uniformly white object having a large area. Another shortcoming of the conventional method lies in that the adjustment must be carried out while watching the view finder. There is another known method in which the video camera is provided with a white colored cap in addition to a light shielding lens cap and the white cap is mounted for white balance adjustment. The white cap method, however, has necessitated mounting of the white cap every time white balance adjustment is to be carried out and removal for every picture taking operation. This method not only has made picture taking operations more intricate, but has also imposed the problem of storing the white cap. With this prior art employed for adjustment of white balance of a color video camera, particularly that of a simplified video camera which is connected to a video tape recorder and to receive its power supply from the video tape recorder in a video system, the white balance adjustment tends to be forgotten and video recording tends to be carried out without white balance adjustment. Accordingly, the prior art methods have sometimes resulted in picture taking operations with unbalanced colors.

A further shortcoming of the conventional white balance adjustment device is that the white balance is lost every time the power source turns on and off and the white balance must be readjusted every time.

SUMMARY OF THE INVENTION

It is an object of the invention to eliminate the above stated shortcomings of the conventional methods for adjusting white balance in a color video camera.

It is another object of the invention to provide a color video camera which obviates the necessity of any additional operation for adjustment of white balance.

It is a further object of the invention to provide a color video camera which, with a simple structural arrangement prevents sticking when there is no power supply from a power source.

It is still a further object of the invention to provide a system which consists of a combination of a color video camera and a video recorder and is capable of preventing erroneous recording from being carried out prior to adjustment of white balance.

One embodiment of the invention is provided with means for forming a white picture within the camera. The output of the white picture forming means is supplied to image pick-up means disposed within the camera prior to picture taking or video recording. This output is switched over to an ordinary picture prior to the picture taking or video recording operation. This arrangement obviates the necessity of placing a white screen or a white color transmitting, diffusing plate in front of a picture taking lens. Therefore, white balance adjustment can be easily carried out.

In another embodiment of the invention, when a power source switch is turned on from an off state, the output of the white picture forming means is switched over from a state of being guided to the image pick-up means to a state of not being guided to the image pick-up means while white balance is adjusted. This arrangement ensures that white balance adjustment can be automatically effected without being forgotten.

Furthermore, in an embodiment of the invention, white balance adjustment is effected by the first stroke of a trigger switch of the camera and a white picture derived from the white picture forming means is changed to an ordinary picture formed through a picture taking optical system by the second stroke of the trigger switch. This embodiment, therefore, automatically and without fail performs white balance adjustment.

In accordance with this embodiment of the invention, an automatic white balance circuit is actuated for a predetermined period of time by the first stroke of the trigger switch. Then, the termination of the operation of the automatic white balance circuit and a transition from the first stroke to the second stroke of the trigger switch cause a video recording operation to begin. Therefore, white balance of the video recording picture can be adjusted without fail.

These and further objects and advantages of the invention will become apparent from the following detailed description of embodiments thereof taken in connection with accompanying drawings.

BRIEF DESCRIPTION OF THE DRAWINGS

FIG. 4 shows the embodiment in a white balance adjusting state;

FIG. 5 shows the embodiment with the power source turned off; and

FIG. 6 shows the embodiment in a picture taking state.

DETAILED DESCRIPTION OF THE PREFERRED EMBODIMENTS

Figure 1:
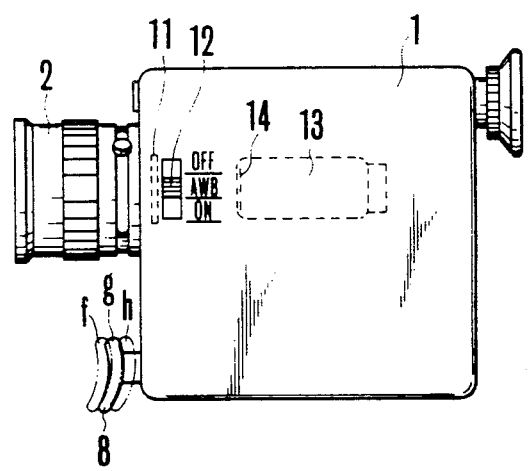
FIG. 1 is an elevational view of a color video camera according to the present invention.

An embodiment of the video camera of the camera in accordance with the invention which has a white balance adjustment device arranged according to the invention is shown in a side view in FIG. 1. In the camera shown, a light passing through a picture taking optical system 2 is imaged on an image pick-up face 14 of an image pick-up device 13. A white color transmitting, diffusing plate 11 serving as white picture forming means (hereinafter called the white plate) is movable back and forth within the body 1 of the camera between the lens 2 and the image pick-up face 14. The camera is provided with a power source switch operating part 12 and a trigger member 8.

Figure 2:
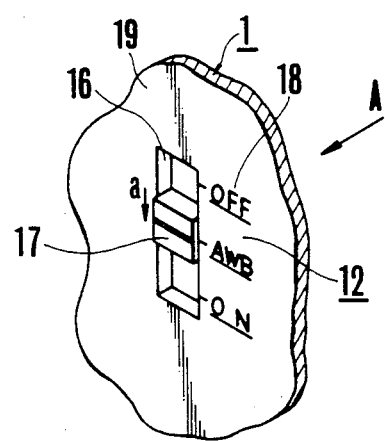
FIG. 2 is an oblique view showing the power source switch operating part of the camera in accordance with the invention.
Figure 3:
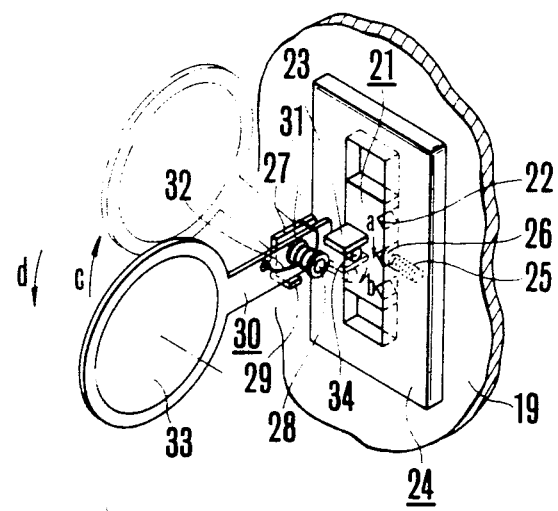
FIG. 3 is a perspective view showing the structural arrangement of white picture forming means and switch-over control means used in an embodiment of the invention.

The details of the power source switch operating part 12 shown in FIG. 1 are shown in a perspective view in FIG. 2. A switch operating member 17 is slidable within a sliding slit 16 provided in a part 19 of the camera body 1. The body part 19 is provided with marking letters 18 indicating the positions of the switch operating member 17. On the inside of the camera body at the switch operating part 12, are provided the white plate 11 and a switch-over control mechanism which is shown in a perspective view in FIG. 3. Referring to FIG. 3, a slide plate 21, which is formed into one unified body with the switch operating member 17, is provided with three triangular notches 22 and a projection 23. The slide plate 21 is carried by a slide support plate 24 which is secured to the body part 19. In the face of the slide support plate 24 disposed opposite the notches 22 of the slide plate 21, there is provided a hole. This hole has a compression spring 25 and a ball 26 inserted therein. The slide support plate 24 is provided with a projection 27 which has a post 28 disposed thereon. The projection 27 is further provided with a rectangularly bent stopper 29. The post 28 pivotally carries a filter plate 30. The filter plate 30 is biased in the direction of arrow d by a torsion coil spring 32. The filter plate 30 is provided with the white plate 33 which serves as a white picture forming means. There is also provided a pin 34. A reference symbol e indicates the optical axis of a picture taking optical system. The axis of the image pick-up device 13 is disposed in aligned relationship with this optical axis. This embodiment of the present invention operates as described below.

When the operating member or button 17 is in the upper position marked "OFF", the power supply from a power source is off. THe actuating projection 23 is not in contact with the pin 34. Under this condition, since the filter plate 30 is being urged to move in the direction of arrow d by the coil spring 32, the plate 30 is in contact with the stopper 29. In this position, the white plate 33 is registered with the optical axis e.

When the operating button 17 is shifted to the middle position which is a white balance adjustment position (hereinafter called the position "AWB"), the slide plate 21 also moves in the direction of arrow a. This causes the ball 26, which is being urged by the compression spring 25, to fall in the second notch 22 of the slide plate 21. The actuating projection 23 then stops in a position in which it is in contact with the pin 34. Then, the power supply is turned on by a switch (not shown) to operate a white balance adjustment circuit for a predetermined period of time. The light, which passes through the lens 2 under this condition, passes through the white plate 33 and reaches the image pick-up face 14 of the image pick-up device 13. This gives information on a white picture to the image pick-up device and white balance adjustment is performed automatically. Following this, when the operating button 17 is further moved in the direction of arrow a into another position "ON", the actuating projection 23 also moves in the direction of arrow a to push down the pin 34 in the direction of arrow b. With the pin 34 depressed in this manner, the white plate 33 moves in the direction of arrow c against the force of the torsion coil spring 32. The ball 26 then falls in the third notch 22 of the slide plate 21. This causes the white plate 33 to take a position indicated by two-dot chain lines in FIG. 3. A video recording operation may begin either with the power source switch 12 set in the position "ON" or by operating the separate trigger member 8. A video recording operation may begin in the same manner in another embodiment wherein a single part is arranged to perform combined functions as power source switch and trigger 8. In this embodiment, the trigger member 8 is operated in two steps, as shown in FIG. 1. When the trigger 8 is operated in a first step position g, the power source and the white balance adjustment circuit are turned on. Then, with the white plate 11 cutting the light flux under that condition, white balance adjustment is automatically carried out. When the trigger 8 is operated in the second step position h, the white plate 11 moves out of the optical path to begin a recording operation.

In another embodiment of the invention, the white balance adjustment device is provided with a shutter member which shuts out a light incident upon the image pick-up device 13. In this case, the video camera is arranged as follows: As shown in FIG. 1, the image pick-up device 13 is disposed within the camera body and has a light which passes through the lens 2 always imaged on the image pick-up face 14 thereof. In the conventional color video camera, when the light incident upon the image pick-up device is of a high degree of intensity, sticking takes place if the image pick-up device is an image pick-up tube. Sticking permanently damages the image pick-up face and causes black dots to appear on images. Furthermore, even in the case of a solid image pick-up element, prolonged imaging of a light such as sunlight either permanently damages the image pick-up face or affects a stripe filter disposed in front of the element. This has been a serious shortcoming conventional color video cameras.

Such sticking is caused not only by the intensity of the light but also by the length of time during which the surface of an element is irradiated by a light. Generally, when a picture taking operation is performed with a video camera, such sticking can be prevented by operator care and by not allowing an intense light to enter the image pick-up tube while peeping into the view finder. Sticking is also often unintentionally prevented by panning, tilting and taking pictures intermittently. Therefore, sticking does not usually happen during actual picture taking operations. However, to protect the camera from sticking while not in use, various precautions have been taken. Such precautions include provision of a cap mounted on the front face of the lens. However, such a cap tends to be either lost or not mounted on the lens. It is troublesome to repeatedly mount and dismount it during intermittent picture taking operations. Therefore, despite precaution against sticking has, sticking still often occurred when the video camera; carried around without the cap mounted on the lens. Furthermore, sticking tends to occur, for example, in cases where the light of the setting sun is allowed to enter the camera while the camera is left close to a window without the cap mounted on the lens; artificial light is allowed to enter over a long period of time while the camera is left on a tripod with the cap off; and intense sunlight is allowed to enter while the camera is carried on the shoulder with the lens facing upward without the cap on the lens while the camera is not in use. Once sticking occurs, the camera must have the expensive image pick-up element replaced, and spend much time and labor in assembling, alignment and adjusting work. Conventionally known methods for solving this problem include an automatic shutter method in which the shutter automatically closes in response to an automatic iris stop; and an independent shutter method in which a shutter button is independently arranged. However, the automatic shutter method has a shortcoming in that it necessitates the use of a complex electrical driving mechanism which results in a high cost while, in the independent shutter method, the operator tends to forget to close the shutter. These shortcomings in conventional methods are eliminated by an embodiment of the invention shown in FIGS. 4, 5 and 6.

Figure 4:
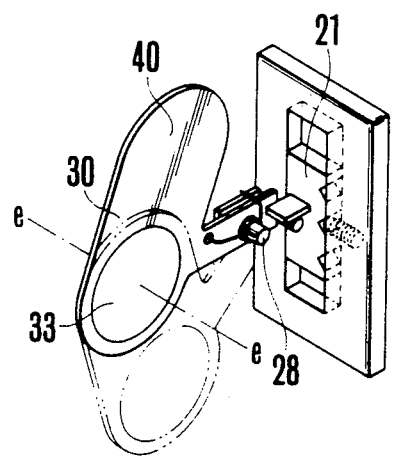
FIGS. 4, 5 and 6 are perspective views showing an embodiment of the invention in which the white picture forming means of the invention is provided with a light flux blocking plate.
Figure 5:
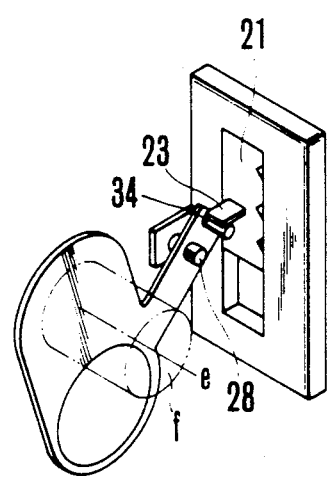
Figure 6:
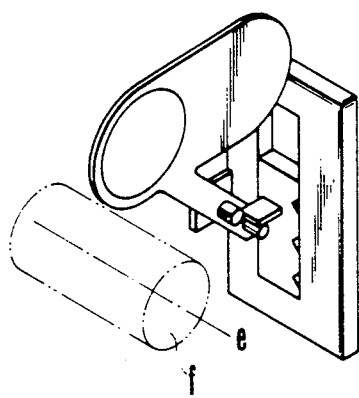

Referring now to FIG. 4, the embodiment is provided with a shutter mechanism. In FIG. 4, the parts which are the same as those shown in FIG. 3 are indicated by the same reference numerals. Unlike the arrangement of FIG. 3, the filter plate 30 is provided with a shutter part 40 while the stopper 29 is not provided. FIG. 5 is an oblique view showing the arrangement of FIG. 4 having the power supply switched off. Under this condition, the slide plate 21 is in the upper position and the actuating projection 23 is in contact with the pin 34. The shutter part 40 of the filter plate 30 is in a position to block a light flux f coming from the lens to prevent it from reaching the image pick-up device. When the operating button is pushed down to the white balance adjusting position, the actuating projection 23 pushes the pin 34 downward. The downward movement of the pin 34 then causes the filter plate 30 to rotate clockwise on the post 28 and thus brings the white plate 33 into a position cutting the light flux f. With the white plate 33 in this position, a switch (not shown) causes a white balance adjustment circuit to operate so that white balance is automatically adjusted. This condition is shown by full lines in FIG. 4. FIG. 6 shows the embodiment of FIG. 4 in a picture taking condition. When the operating button is set in the position "ON", the pin 34 is further pushed down by the actuating projection 23 causing the filter plate 30 to rotate on the post 28 away from the light flux f and the power supply is turned on. The image pick-up operation may begin either with the power source button 12 set in the position "ON" or by operating a trigger button separately. The trigger button may be operated in two steps in such a way as to have the filter plate 30 moved thereby. Furthermore, the shutter part 40 and the white plate 33 may be separately formed and may be interlocked with each other.

When the power supply is to be turned off, a reverse operation is performed and the shutter is closed without fail. Such an arrangement ensures that the image pick-up device is protected by the shutter when the camera is not in use, so that any serious sticking problem can be prevented.

The embodiment described above is capable of performing white balance adjustment and protecting the image pick-up device without fail with simple structural arrangement, at a low cost and yet without impaired video camera mobility. The arrangement of the embodiment is particularly advantageous for a video camera which is combined in one unified body with a VTR because, in such a case, a completely independent power source switch is attached to the camera body.

In the white balance adjustment device, according to the present invention, the white color transmitting, diffusing plate for white balance adjustment is inserted into and removed from the image pick-up light flux in response to the on and off actions of the power source switch during the on and off actions in such a way as to permit the white balance adjustment. Therefore, the white balance is easily adjusted for every picture taking operation. The adjustment will never be forgotten before a picture taking operation. No picture taking operation will be performed with the white color transmitting, diffusing plate not returned to its original position. The white balance adjustment can thus be very effectively performed. Furthermore, with a light shielding plate either formed into one unified body with the above stated white balance adjustment device or interlocked with the white balance adjustment device, sticking can be prevented while the camera has no power supply from the power source. This arrangement is highly effective for protection of the image pick-up device.

Figure 7:
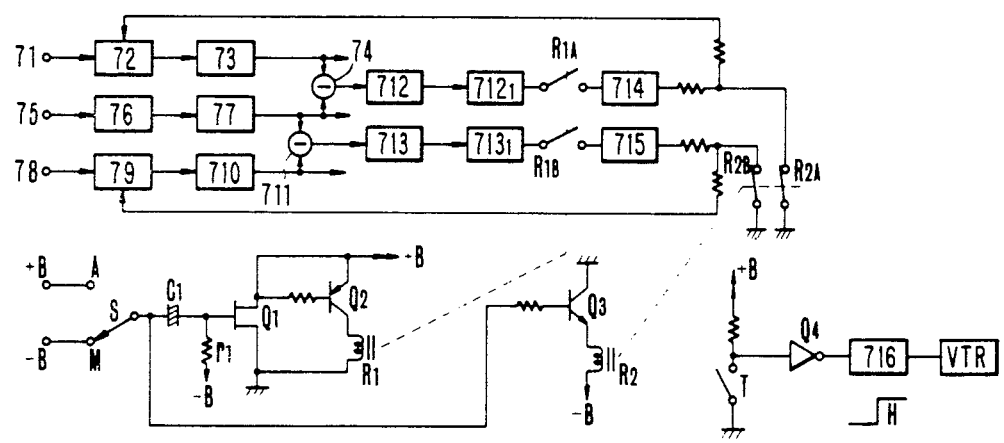
FIG. 7 is a circuit diagram showing the operating principle of the white balance adjustment circuit used in the conventional color video camera.

FIG. 7 shows an example of the automatic white balance adjusting circuit employed in the conventional color TV camera. Operation of this circuit is as follows: A red signal R which is obtained at a red signal input terminal 71 is supplied through a gain control amplification circuit 72 and a red process circuit 3 to an encoder (not shown) and to a G-R color difference computing circuit 74. On the other hand, a green signal G which is obtained at a green signal input terminal 75 is supplied to an encoder circuit (not shown), to the G-R color difference computing circuit and to a G-B color difference computing circuit 11 through an amplifying circuit 76 and a green process circuit 77. A blue signal B which is obtained at a blue signal input terminal 78 is divided and supplied to an encoder circuit (not shown) and to the G-B color difference computing circuit 711 through a gain control amplification circuit 79 and a blue process circuit 710. The output signal of the G-R color difference computing circuit 74 is converted into a direct current at a D.C. converting ciruit $12_1$ after it is amplified through a differential amplifier circuit 712. The output signal of the G-B color difference computing circuit 711 is converted into a direct current at a D.C. converting circuit $13_1$ after it is amplified through a differential amplifier circuit 713. When a change-over switch S for the white balance adjusting circuit is on a manual side M thereof, a voltage $-B$ is applied to the gate of a field effect transistor $Q_1$ (hereinafter called FET) to put the FET $Q_1$ in a cut off state. Since a transistor $Q_2$ is thus also in a cut off state, no current flows to a relay $R_1$ and the relay contacts $R_{1A}$ and $R_{1B}$ thereof are open. Furthermore, a transistor $Q_3$ is also in a cut off state. Therefore, a relay $R_2$ also has no current flowing and the relay contacts $R_{2A}$ and $R_{2B}$ are open. Therefore, the automatic white balance adjusting circuit is grounded. Under this condition, when the TV camera is directed to a white object and the switch S is shifted to an automatic side A thereof, the voltage at one side (on the side facing the switch S) of a capacitor changes from the voltage $-B$ to a voltage $+B$. Then, the gate of the FET $Q_1$ is momentarily biased in the direction of a $+$ voltage. Then, a current flows to the FET $Q_1$ for a given period of time required for white balance adjustment and determined by a time constant of $C_1 \cdot r_1$. At the same time, the relay $R_1$ closes the contacts $R_{1A}$ and $R_{1B}$. Furthermore, since the transistor $Q_3$ then also has a current flow thereto, the relay $R_2$ opens the contacts $R_{2A}$ and $R_{2B}$. The automatic white balance adjusting circuit then forms a loop. The output signals of the differential amplifying circuits 712 and 713 obtained are then stored respectively at a G-R signal memory circuit 714 and a G-B signal memory circuit 715 after they are converted into direct currents. The red gain control amplification circuit 2 is controlled by the D.C. output signal (G-R) of the G-R signal memory circuit 714 to adjust the level of a red process output signal to that of a green process output signal. Meanwhile, a G-B D.C. output signal from the G-B signal memory circuit 715 likewise controls the blue gain control amplification circuit 79. In this manner, white balance is automatically adjusted by adjusting the levels of the red, green and blue signals of the process circuits 73, 77 and 710 to equalize them. Here, the FET $Q_1$ begins to discharge at the time constant of $C_1 \cdot r_1$. After that, the FET $Q_1$ goes back to the cut off state to cause opening of the the contacts $R_{1A}$ and $R_{1B}$. Meanwhile, the D.C. output voltages of the memory circuits 714 and 715 remain unchanged keeping the TV camera in a state of good white balance.

However, after the power source switch of the camera is turned off under this condition, thereafter the power source switch is turned on again, the $+B$ voltage is instantly applied to the gate of the FET $Q_1$, because the switch S is on automatic at the time. A current flows to the FET $Q_1$. The relay $R_1$ closes the contacts $R_{1A}$ and $R_{1B}$. This causes the automatic white balance adjustment circuit to operate. In the meantime, the relay $R_2$ is energized to open the contacts $R_{2A}$ and $R_{2B}$. At the instant when the power source switch is turned on, however, the image pick-up tube of the TV camera still does not have a sufficient flow of beam currents. Furthermore, the beam currents of red, blue and green are uneven. Accordingly, the red, blue and green output levels are uneven and are in transient states. White balance is obtained under such a transient condition. Therefore, the white balance is completely lost during normal camera operation.

With the automatic white balance adjusting circuit of the conventional TV camera, white balance is lost every time the power source switch is turned on. This has made it necessary to find and use a suitable white object and to again operate the white balance changeover switch S.

Again referring to FIG. 7, a signal from a trigger switch T is supplied to a VTR (video tape recorder) start circuit 716 through an inverter $Q_4$. When the trigger switch T is turned on the VTR operates by a known method.

Figure 8:
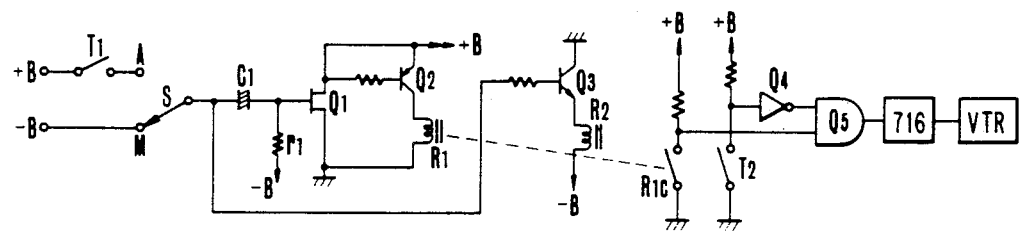
FIG. 8 is a circuit diagram showing an automatic white balance adjustment circuit of a color video camera according to an embodiment of the invention.

While a three-tube type TV camera has been described in the foregoing, the description is also applicable to a single-tube type TV camera with the exception that the green signal G is replaced with a brightness signal Y in the latter case. In the conventional arrangement, as shown in FIG. 7, the white balance changeover switch S must be shifted to the manual side M and the white balance must be adjusted before the start of picture taking or video recording operations every time the picture taking scene changes. These troublesome steps can be omitted by an embodiment of the invention in which the first white balance adjustment is automatically effected. The first step depression of the trigger lever of the camera, automatically adjusts the white balance. The second depression prepares the camera for a video recording operation. Furthermore, to obviate the trouble of finding a white object for white balance adjustment, a milk-white colored window is provided on the camera to obtain white balance, not only for a white object but also for objects of any other colors. This arrangement, according to the present invention, obviates the necessity of the above troublesome steps for balance adjustment. In accordance with the invention, a picture taking operation can begin with the white balance adjusted by a simple trigger operation. Another important feature of the invention is that a picture taking switch, which is interlocked with the second step of the trigger, is inhibited from operating until completion of the white balance adjustment. FIG. 8 shows an example of the automatic white balance adjustment circuit of the color video camera in the present invention. FIG. 8 shows only the relay drive circuit and the trigger circuit that are directly related to the present invention. A switch $T_1$, which is turned on by the first depression of the trigger button is disposed between the power supply $+B$ and the automatic side (or position) A of the switch S, as clearly shown in FIG. 9. Furthermore, the signal of a switch $R_{1C}$, which is interlocked with a relay $R_1$, and the signal of a switch $T_2$, which is responsive to the second depression of the trigger button, are supplied to an AND circuit $Q_5$. The output of the AND circuit is supplied to the VTR start circuit.

Figure 9:
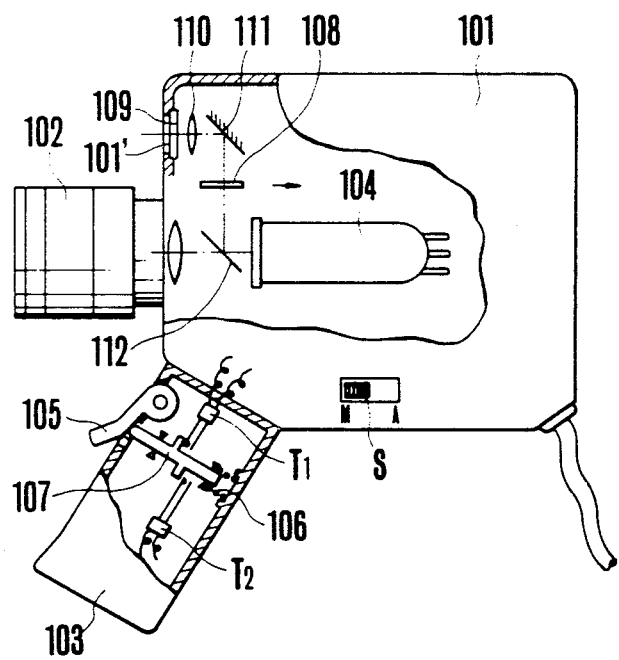
FIG. 9 is a schematic illustration of the structural arrangement of a color video camera according to an embodiment of the invention.

FIG. 9 is a schematic illustration showing an example of the structural arrangement of a color video camera, according to the present invention. In the illustration, the camera comprises a video camera body 101; an image pick-up optical system 102; a grip 103 and an image pick-up tube 104 serving as image pick-up means. The color video camera operates in the following manner:

When a trigger button 105 is pushed, a slidable trigger lever 107 which is biased by a spring 106 turns on a trigger switch $T_1$ by the initial travel of the lever. Then, in response to this switch action, a light shielding wall 108, which has been blocking a light coming through an external light intake window 101', is retracted from the optical path by means of a plunger, a lever link mechanism or the like. With the shielding wall thus retracted, a light coming through the external light intake window 101' is guided to the image pick-up tube 104 through a white color transmitting, diffusing plate 109, a condenser lens, a reflection mirror 111 and a semi-transparent mirror 112. Then, the white balance adjustment circuit, which is shown in FIG. 7, begins to operate.

The additional travel of the trigger lever 107 turns on the trigger switch $T_1$. The recording operation of a magnetic recording/reproducing device (not shown) begins after completion of white balance adjustment.

In this particular embodiment of the invention as shown in FIG. 9, the external light intake window 101' is above the lens and parallel with the optical axis thereof. However, the window 101' of course, may be in the upper face of the camera body 101. Furthermore, the external light intake window 101' may be replaced with a milk white colored plate by retractably inserting it between the lens 102 and the image pick-up tube 104, as shown in FIG. 3, and by interlocking it with the trigger switch $T_1$. In that case, the white balance is obtained from a light passing through the lens 102. The milk-white plate is promptly retracted before the trigger switch $T_2$ begins a video recording operation.

In the embodiment shown in FIG. 9, when the first step trigger switch $T_1$ is turned on for white balance adjustment, the relay $R_1$ operates for a length of time determined by the time constant of $C_1 \cdot r_1$, because the external change-over switch S has already been shifted to automatic position A, as described in FIG. 1. Then, another relay $R_2$ turns on concurrently with the switch $T_1$. This causes the white balance adjustment circuit to operate. The relay switch $R_{1C}$, which is interlocked with the relay $R_1$, is then also turned on for the same length of time as the relay $R_1$. The AND circuit $Q_5$ produces a low level signal. The white balance adjustment is completed within the length of time determined by the time constant of $C_1 \cdot r_1$. Upon completion of the white balance adjustment, the relay $R_1$ again becomes inoperative. The switch $R_{1C}$ also turns off causing the AND circuit $Q_5$ to produce a high level signal. Before or after this, when the second step trigger switch $T_2$ is turned on, the second input terminal of the AND circuit $Q_5$ receives a high level input through the inverter $Q_4$. Accordingly, the AND circuit $Q_5$ produces a high level output turning on the VTR start circuit 16 and starting a picture taking or video recording operation. Arranged accordingly, a picture taking operation is never allowed to begin before completion of the white balance adjustment.

Figure 10:
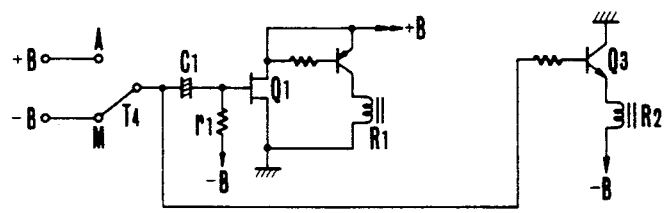
FIG. 10 is a circuit diagram showing connection between essential parts of a color video camera in another embodiment of the invention.

FIG. 10 is a circuit diagram showing the essential parts of another embodiment of the invention. In this embodiment, the auto-manual change-over switch S, shown in FIG. 8, is not used. The switch S is replaced with an automatic change-over switch, which is arranged in the following manner in this particular embodiment: Manual operation is achieved when the trigger button 105, as shown in FIG. 9 is not pushed. Manual operation is shifted to automatic operation when the trigger button is pushed.

In the embodiment shown in FIG. 8, the automatic white balance adjustment circuit is actuated only when the auto-manual change-over switch S provided on the outside for white balance adjustment is shifted to the automatic position A. After that, the switch $T_1$ is turned on when the trigger button is first depressed. In the embodiment shown in FIG. 10, the automatic white balance adjustment circuit can be actuated solely by means of a switch $T_4$ which is responsive to the first depression of the trigger button. The embodiment is arranged such that white balance adjustment is always on the manual side when the switch $T_4$ is inoperative.

In this embodiment of the invention, the white balance adjustment can be performed by the first stroke of the trigger switch of the camera and video recording begins only after completion of the white balance adjustment. This arrangement simplifies the operability of the camera and ensures that the white balance adjustment operates without fail. This provides a great advantage in the operability of a color video camera.

What is claimed is:
1. A color image pick-up device, comprising:
 (a) image pick-up means arranged to convert an image into an electrical signal including a plurality of color signal components;
 (b) white balance control signal forming means for forming a white balance control signal;
 (c) memory means for memorizing said control signal;
 (d) white balance control means for controlling a proportion of each color signal component contained in the output signal of said image pick-up means in accordance with said control signal memorized in said memory means;
 (e) a first switch for actuating the white balance control signal forming means to start forming said control signal and for causing said memory means to memorize said control signal;
 (f) a second switch for actuating an image recording; and
 (g) a successive operation member for sequentially actuating said first switch and said second switch in the named order.

2. A color image pick-up device according to claim 1, further comprising:
 (a) completion signal forming means for forming a completion signal in accordance with completion of memorizing of the control signal by said memory means; and
 (b) start means responsive to the second switch and the completion signal to start the recording.

3. A color image pick-up device according to claim 2, in which the completion signal forming means includes a timer which outputs the completion signal a predetermined time after actuation of the first switch.

4. A color image pick-up device according to claim 1, in which said memory means memorizes the control signal in the timing between the actuation of the first switch and the actuation of the second switch.

* * * * *